(12) United States Patent
Zhao et al.

(10) Patent No.: US 12,518,762 B2
(45) Date of Patent: Jan. 6, 2026

(54) EVALUATION-BASED SPEAKER CHANGE DETECTION EVALUATION METRICS

(71) Applicant: Google LLC, Mountain View, CA (US)

(72) Inventors: Guanlong Zhao, Long Island City, NY (US); Quan Wang, Hoboken, NJ (US); Han Lu, Redmond, WA (US); Yiling Huang, Edgewater, NJ (US); Jason Pelecanos, Mountain View, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 18/483,492

(22) Filed: Oct. 9, 2023

(65) Prior Publication Data

US 2024/0135934 A1 Apr. 25, 2024

Related U.S. Application Data

(60) Provisional application No. 63/379,135, filed on Oct. 11, 2022.

(51) Int. Cl.
*G10L 17/06* (2013.01)
*G10L 17/02* (2013.01)
(Continued)

(52) U.S. Cl.
CPC .............. *G10L 17/06* (2013.01); *G10L 17/02* (2013.01); *G10L 17/04* (2013.01); *G10L 17/18* (2013.01)

(58) Field of Classification Search
CPC ......... G10L 17/02; G10L 17/04; G10L 17/06; G10L 17/08; G10L 17/18
See application file for complete search history.

(56) References Cited

U.S. PATENT DOCUMENTS 10,535,000 B2 * 1/2020 Ge ........................ G10L 17/04
10,978,073 B1 * 4/2021 Fu ..................... H04M 3/42127
(Continued)

OTHER PUBLICATIONS

Wei Xia et al: "Turn-to-Diarize: Online Speaker Diarizaton Constrained by Transformer Transducer Speaker Turn Detection", arvix. org, Cornell University Library, 201 Olin Library Cornell University Ithaca, NY 14853 Jan. 25, 2022 (Jan. 25, 2022), XP091128195.
(Continued)

*Primary Examiner* — Shaun Roberts
(74) *Attorney, Agent, or Firm* — Honigman LLP; Brett A. Krueger

(57) ABSTRACT

A method includes obtaining a multi-utterance training sample that includes audio data characterizing utterances spoken by two or more different speakers and obtaining ground-truth speaker change intervals indicating time intervals in the audio data where speaker changes among the two or more different speakers occur. The method also includes processing the audio data to generate a sequence of predicted speaker change tokens using a sequence transduction model. For each corresponding predicted speaker change token, the method includes labeling the corresponding predicted speaker change token as correct when the predicted speaker change token overlaps with one of the ground-truth speaker change intervals. The method also includes determining a precision metric of the sequence transduction model based on a number of the predicted speaker change tokens labeled as correct and a total number of the predicted speaker change tokens in the sequence of predicted speaker change tokens.

26 Claims, 7 Drawing Sheets

(51) Int. Cl.
  *G10L 17/04*  (2013.01)
  *G10L 17/18*  (2013.01)

(56) References Cited

U.S. PATENT DOCUMENTS

| 11,423,911 | B1* | 8/2022 | Fu | G10L 15/26 |
|---|---|---|---|---|
| 2017/0084295 | A1* | 3/2017 | Tsiartas | G10L 17/08 |
| 2018/0286409 | A1* | 10/2018 | Baughman | G06F 3/165 |
| 2019/0115029 | A1* | 4/2019 | Kracun | G10L 15/08 |
| 2019/0304470 | A1* | 10/2019 | Ghaemmaghami | G10L 17/02 |
| 2020/0152207 | A1* | 5/2020 | Wang | G10L 17/04 |
| 2020/0160845 | A1* | 5/2020 | Lavilla | G10L 15/005 |
| 2020/0219517 | A1* | 7/2020 | Wang | G10L 17/02 |
| 2021/0118427 | A1* | 4/2021 | Braga | G10L 19/008 |
| 2022/0122615 | A1* | 4/2022 | Chen | G10L 21/028 |
| 2022/0319535 | A1* | 10/2022 | Chawla | G10L 21/0272 |
| 2023/0352041 | A1* | 11/2023 | Park | G10L 21/0308 |
| 2023/0402058 | A1* | 12/2023 | Tanveer | G10L 17/08 |

OTHER PUBLICATIONS

Wikicleaner bot: "Precision and recall", Wikipedia.org, Sep. 9, 2022 (Sep. 9, 2022), pp. 1-12, XP093122409.
Guanlong Zhao et al: "Augmenting Transformer-Transducer Based Speaker Change Detection With Token-Level Training Loss", arvix.org, Cornell University Library, 201 Olin Library Cornell University Ithaca, NY 14853, Nov. 11, 2022 (Nov. 11, 2022), XP091367696.
Huanru Henry Mao et al: "Spech Recognition and Multi-Speaker Diarization of Long Conversations", arvix.org, Cornell University Library, 201 Olin Library Cornell University Ithaca, NY 14853, May 16, 2020 (May 16, 2020), XP081674821.
Laurent El Shafey et al: "Joint Speech Recognition and Speaker Diarization via Sequence Transduction", arvix.org, Cornell University Library, 201 Olin Library Cornell University Ithaca, NY 14853, Jul. 9, 2019 (Jul. 9, 2019), XP081440969.
Tae Jin Park et al: "Multimodal Speaker Segmentation and Diarization using Lexical and Acoustic Cues via Sequence Neural Networks", arvix.org, Cornell University Library, 201 Olin Library Cornell University Ithaca, NY 14853, May 28, 2018 (May 28, 2018), XP080882969.
International Search Report and Written Opinion issued in related PCT Application No. PCT/US2023/034766, dated Feb. 12, 2024.

\* cited by examiner

EVALUATION-BASED SPEAKER CHANGE DETECTION EVALUATION METRICS

CROSS REFERENCE TO RELATED APPLICATIONS

This U.S. Patent Application claims priority under 35 U.S.C. § 119(e) to U.S. Provisional Application 63/379,135, filed on Oct. 11, 2022. The disclosure of this prior application is considered part of the disclosure of this application and is hereby incorporated by reference in its entirety.

TECHNICAL FIELD

This disclosure relates to evaluation-based speaker change detection evaluation metrics.

BACKGROUND

Speaker change detection is the process of receiving input audio data and outputting speaker turn tokens that identify speaker transition points (e.g., when one speaker stops speaking and another speaker starts speaking) during a conversation with multiple speakers. Conventionally, speaker change detection maps input acoustic features to a frame-level binary prediction indicating whether a speaker change has occurred. However, training models to perform speaker change detection may suffer from significant variations present in most annotated training data. That is, identifying an exact time the speaker transition point occurred is highly subjective and is dependent upon who is annotating the training data. As such, the significant variations of annotated training data may cause performance degradations of the models performing the speaker change detection.

SUMMARY

One aspect of the disclosure provides a computer-implemented method that when executed on data processing hardware causes the data processing hardware to perform operations for evaluating speaker change detection in multi-speaker continuous conversational input audio stream. The operations include obtaining a multi-utterance sample that includes audio data characterizing utterances spoken by two or more different speakers. The operations also include obtaining ground-truth speaker change intervals indicating time intervals in the audio data where speaker changes among the two or more different speakers occur. The operations also include processing, using a sequence transduction model, the audio data to generate a sequence of predicted speaker change tokens each indicating a location of a respective speaker turn in the audio data. For each corresponding predicted speaker change token, the operations include labeling the corresponding predicted speaker change token as correct when the predicted speaker change token overlaps with one of the ground-truth speaker change intervals. The operations also include determining a precision metric of the sequence transduction model based on a number of the predicted speaker change tokens labeled as correct and a total number of the predicted speaker change tokens in the sequence of predicted speaker change tokens.

Implementations of the disclosure may include one or more of the following optional features. In some implementations, determining the precision metric of the sequence transduction model is based on a ratio between the number of the predicted speaker change tokens labeled as correct and the total number of the predicted speaker change tokens in the sequence of predicted speaker change tokens. For each corresponding predicted speaker change token, the operations may further include labeling the corresponding predicted speaker change token as a false acceptance prediction when the corresponding speaker change token does not overlap with any of the ground-truth speaker change intervals.

In some examples, the operations further include labeling, for each ground-truth speaker change interval, the corresponding ground-truth speaker change interval as correctly matched when any of the predicted speaker change tokens overlap with the corresponding ground-truth speaker change interval and determining a recall metric of the sequence transduction model based on a duration of the ground-truth speaker change intervals labeled as correctly matched and a total duration of all of the ground-truth speaker change intervals. In these examples, the operations may further include determining a performance score of the sequence transduction model based on the precision metric and the recall metric. Here, determining the performance score includes calculating the performance score based on the equation: 2*(precision metric*recall metric)/(precision metric+recall metric).

In some implementations, the multi-utterance training sample further includes ground-truth speaker labels paired with the audio data where the ground-truth speaker labels each indicate a corresponding time-stamped segment in the audio data associated with a respective one of the utterances spoken by one of the two or more different speakers and obtaining the ground-truth speaker change intervals includes: identifying, as a corresponding ground-truth speaker change interval, each time interval where two or more of the time-stamped segments overlap; and identifying each time gap indicating a pause between two adjacent time-stamped segments in the audio data associated with respective ones of the utterances spoken by two different speakers. In these implementations, the operations may further include determining a minimum start time and a maximum start time of the audio data based on the time-stamped segments indicated by the ground-truth speaker labels and omitting, from the determination of the precision metric of the sequence transduction model, any predicted speaker change tokens having time stamps earlier than the minimum start time or later than the maximum start time. In some examples, determining the precision metric of the sequence transduction model is not based on any word-level speech recognition results output by the sequence transduction model. Determining the precision metric may not require performance of full speaker diarization on the audio data.

Another aspect of the disclosure provides a system that includes data processing hardware and memory hardware storing instructions that when executed on the data processing hardware causes the data processing hardware to perform operations. The operations include obtaining a multi-utterance sample that includes audio data characterizing utterances spoken by two or more different speakers. The operations also include obtaining ground-truth speaker change intervals indicating time intervals in the audio data where speaker changes among the two or more different speakers occur. The operations also include processing, using a sequence transduction model, the audio data to generate a sequence of predicted speaker change tokens each indicating a location of a respective speaker turn in the audio data. For each corresponding predicted speaker change token, the operations include labeling the corresponding predicted speaker change token as correct when the predicted speaker change token overlaps with one of the ground-truth speaker change intervals. The operations also include determining a precision metric of the sequence transduction model based on a number of the predicted speaker change tokens labeled as correct and a total number of the predicted speaker change tokens in the sequence of predicted speaker change tokens.

Implementations of the disclosure may include one or more of the following optional features. In some implementations, determining the precision metric of the sequence transduction model is based on a ratio between the number of the predicted speaker change tokens labeled as correct and the total number of the predicted speaker change tokens in the sequence of predicted speaker change tokens. For each corresponding predicted speaker change token, the operations may further include labeling the corresponding predicted speaker change token as a false acceptance prediction when the corresponding speaker change token does not overlap with any of the ground-truth speaker change intervals.

In some examples, the operations further include labeling, for each ground-truth speaker change interval, the corresponding ground-truth speaker change interval as correctly matched when any of the predicted speaker change tokens overlap with the corresponding ground-truth speaker change interval and determining a recall metric of the sequence transduction model based on a duration of the ground-truth speaker change intervals labeled as correctly matched and a total duration of all of the ground-truth speaker change intervals. In these examples, the operations may further include determining a performance score of the sequence transduction model based on the precision metric and the recall metric. Here, determining the performance score includes calculating the performance score based on the equation: 2*(precision metric*recall metric)/(precision metric+recall metric).

In some implementations, the multi-utterance training sample further includes ground-truth speaker labels paired with the audio data where the ground-truth speaker labels each indicate a corresponding time-stamped segment in the audio data associated with a respective one of the utterances spoken by one of the two or more different speakers and obtaining the ground-truth speaker change intervals includes: identifying, as a corresponding ground-truth speaker change interval, each time interval where two or more of the time-stamped segments overlap; and identifying each time gap indicating a pause between two adjacent time-stamped segments in the audio data associated with respective ones of the utterances spoken by two different speakers. In these implementations, the operations may further include determining a minimum start time and a maximum start time of the audio data based on the time-stamped segments indicated by the ground-truth speaker labels and omitting, from the determination of the precision metric of the sequence transduction model, any predicted speaker change tokens having time stamps earlier than the minimum start time or later than the maximum start time. In some examples, determining the precision metric of the sequence transduction model is not based on any word-level speech recognition results output by the sequence transduction model. Determining the precision metric may not require performance of full speaker diarization on the audio data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
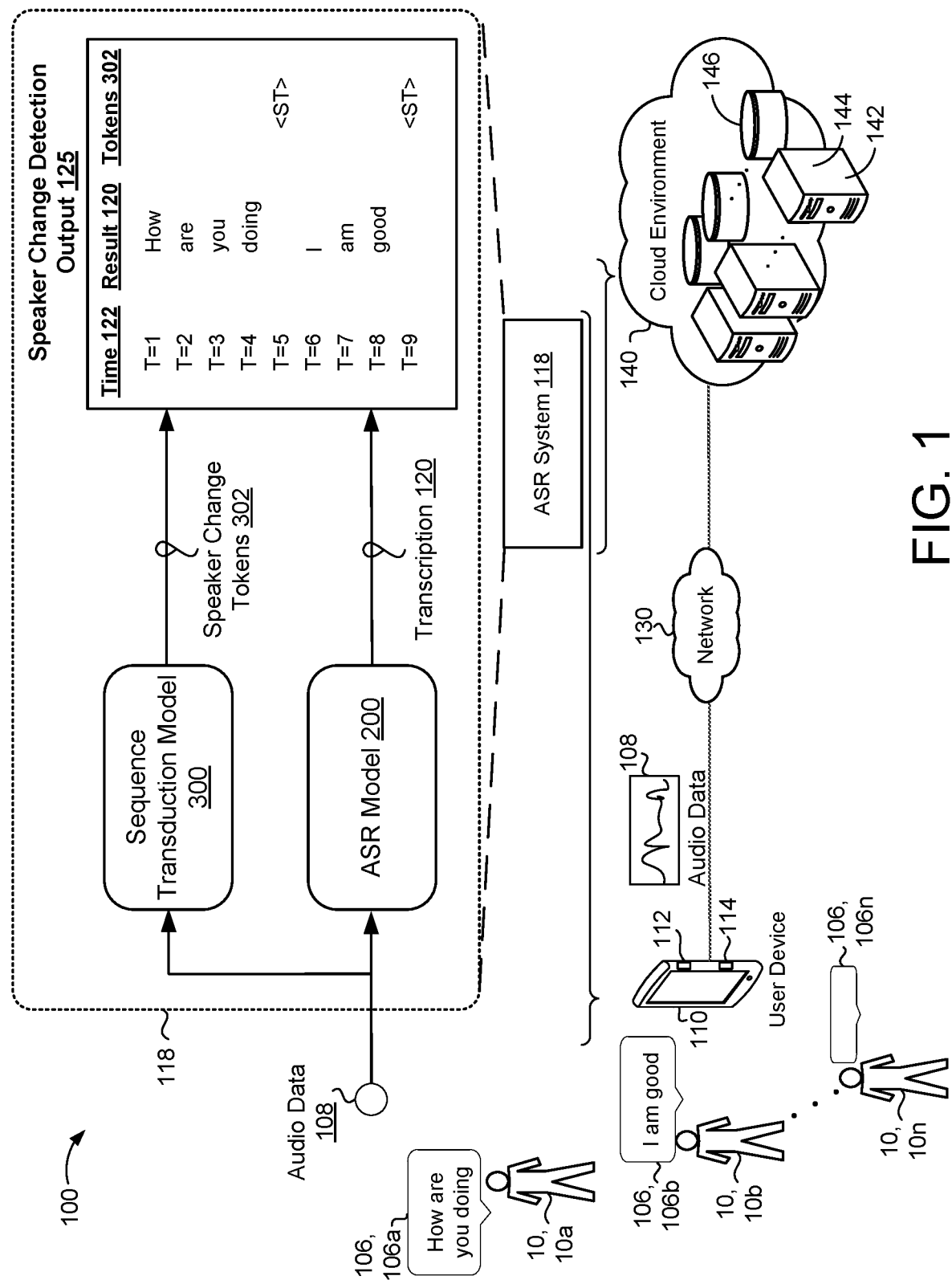
FIG. 1 is a schematic view of an example automatic speech recognition system including an automatic speech recognition model and a sequence transduction model.

In addition to transforming input sequences into output sequences, sequence transduction models have also been constructed for detecting special input conditions and generating special outputs (e.g., special output tokens or other types of indications) when special input conditions are detected. That is, sequence transduction models may be constructed and trained to process a sequence of input data to generate a predicted sequence of outputs that includes, in addition to other normal/common predicted outputs (e.g., graphemes, wordpieces, and/or words), special outputs when the sequence transduction model detects corresponding special input conditions in the input data. For example, a sequence transduction model may process input audio features and output transcriptions representing the input audio features and speaker change tokens "<ST>" indicating a respective speaker turn in a multiple speaker conversation. Here, a speaker turn refers to point in time during the conversation when one speaker stops speaking and/or another speaker starts speaking. Thus, the speaker change tokens indicate the point in time where the speaker turns occur during the conversation.

However, training conventional sequence transduction models has several limitations. For instance, conventional systems require accurate timing information of the speaker change point in the training data, which is difficult because deciding where to mark a speaker change point is a highly subjective process for human annotators. Moreover, methods that use purely acoustic information ignore rich semantic information in the audio signal to identify the speaker change point.

Accordingly, implementations herein are directed towards methods and systems for performing evaluation-based speaker change detection evaluation methods. In particular, a training process trains a sequence transduction model by obtaining a multi-utterance training sample that includes audio data characterizing utterances spoken by two or more different speakers and obtaining ground-truth speaker change intervals indicating time intervals in the audio data where speaker changes occur. The sequence transduction model processes the audio data to generate a sequence of predicted speaker change tokens. Thereafter, the training process labels each predicts speaker change token in the sequence of predicted speaker change tokens as correct when the predicted speaker change token overlaps with one of the ground-truth speaker change intervals. The training process determines a precision metric of the sequence transduction model based on a number of the predicted speaker change tokens labeled as correct and a total number of the predicted speaker change tokens in the sequence of predicted speaker change tokens and trains the sequence transduction model using the precision metric. As will become apparent, the training process may train the sequence transduction model using a recall metric in addition to, or in lieu of, the precision metric.

Referring to FIG. 1, an example system 100 includes a user device 110 capturing speech utterances 106 spoken by two or more speakers 10, 10a-n during a conversation and communicating with a remote system 140 via a network 130. The remote system 140 may be a distributed system (e.g., cloud computing environment) having scalable/elastic resources 142. The resources 142 include computing resources 144 (e.g., data processing hardware) and/or storage resources 146 (e.g., memory hardware). The user device 110 includes data processing hardware 112 and memory hardware 114. The user device 110 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches). The user device 110 may include an audio capture device (e.g., microphone) for capturing and converting the speech utterances 106 from the two or more speakers 10 into an input audio stream (e.g., audio data or sequence of acoustic frames) 108.

The user device 110 and/or the cloud computing environment 140 may execute an automatic speech recognition (ASR) system 118. In some implementations, the user device 110 is configured to execute a portion of the ASR system 118 locally (e.g., using the data processing hardware 112) while a remaining portion of the ASR system 118 executes at the cloud computing environment 140 (e.g., using the data processing hardware 144). Alternatively, the ASR system 118 may execute entirely at the user device 110 or the cloud computing environment 140.

The ASR system 118 is configured to receive the input audio stream 108 corresponding to the multi-speaker continuous conversation and generate a speaker change detection output 125. More specifically, the ASR system 118 includes an ASR model 200 configured to receive the input audio stream 108 and generate, as output, a transcription (e.g., speech recognition result/hypothesis) 120 based on the input audio stream 108. Moreover, the ASR system 118 includes a sequence transduction model (i.e., speaker change detection model) 300 configured to receive the input audio stream 108 and generate, as output, a sequence of predicted speaker change tokens 302 each indicating a location of a respective speaker turn in the input audio stream 108. The ASR system 118 generates the speaker change detection output 125 that includes the transcription 120 generated by the ASR model 200 and the sequence of predicted speaker change tokens 302 generated by the sequence transduction model 300. In some examples, the speaker change detection output 125 includes a sequence of timestamps 122 corresponding to the transcription 120 and the sequence of predicted speaker change tokens 302. Thus, in these examples, the ASR system 118 may align the transcription 120 and the sequence of predicted speaker change tokens 302 based on the corresponding sequence of timestamps 122.

For instance, in the example shown, a first speaker 10a speaks a first utterance 106a of "How are you doing" and a second speaker 10b speaks a second utterance 106b of "I am good." The ASR system 118 receives the input audio stream 108 corresponding to the multi-speaker continuous conversational input (e.g., the first utterance 106a and the second utterance 106b) spoken by the first and second speakers 10a, 10b. In the example shown, the ASR model 200 generates the transcription 120 of "how are you doing I am good" and the sequence transduction model 300 generates the sequence of predicted speaker change tokens 302 indicating the speaker turns at the fifth timestamp 122 (e.g., T=5) and the ninth timestamp 122 (e.g., T=9). Notably, the predicted speaker change token 302 at the fifth timestamp indicates a transition point where the first speaker 10a stops speaking and the second speaker 10b starts speaking, and the predicted speaker change token 302 at the ninth timestamp indicates a transition point where the second speaker 10b stops speaking.

In some implementations, the two or more speakers 10 and the user device 110 may be located within an environment (e.g., a room) where the user device 110 is configured to capture and convert the speech utterances 106 spoken by the two or more speakers 10 into the input audio stream 108. For instance, the two or more speakers 10 may correspond to co-workers having a conversation during a meeting and the user device 110 may record and convert the speech utterances 106 into the input audio stream 108. In turn, the user device 110 may provide the input audio stream 108 to the ASR system 118 to generate the speaker change detection output 125 including the speech recognition results 120 and the sequence of predicted speaker change tokens 302.

In some examples, at least a portion of the speech utterances 106 conveyed in the input audio stream 108 are overlapping such that, at a given instant in time, at least two speakers 10 are speaking simultaneously. Notably, a number N of the two or more speakers 10 may be unknown when the sequence of acoustic frames 108 are provided as input to the ASR system 118 whereby the ASR system 118 predicts the number N of the two or more speakers 10. In some implementations, the user device 110 is remotely located from the one or more of the two or more speakers 10. For instance, the user device 110 may include a remote device (e.g., network server) that captures speech utterances 106 from the two or more speakers 10 that are participants in a phone call or video conference. In this scenario, each speaker 10 would speak into their own user device 110 that captures and provides the speech utterances 106 to the remote user device for converting the speech utterances 106 into the input audio stream 108. Of course in this scenario, the speech utterances 106 may undergo processing at each of the user devices 110 and be converted into a corresponding input audio stream 108 that are transmitted to the remote user device which may additionally process the input audio stream 108 provided as input to the ASR system 118.

Figure 2:
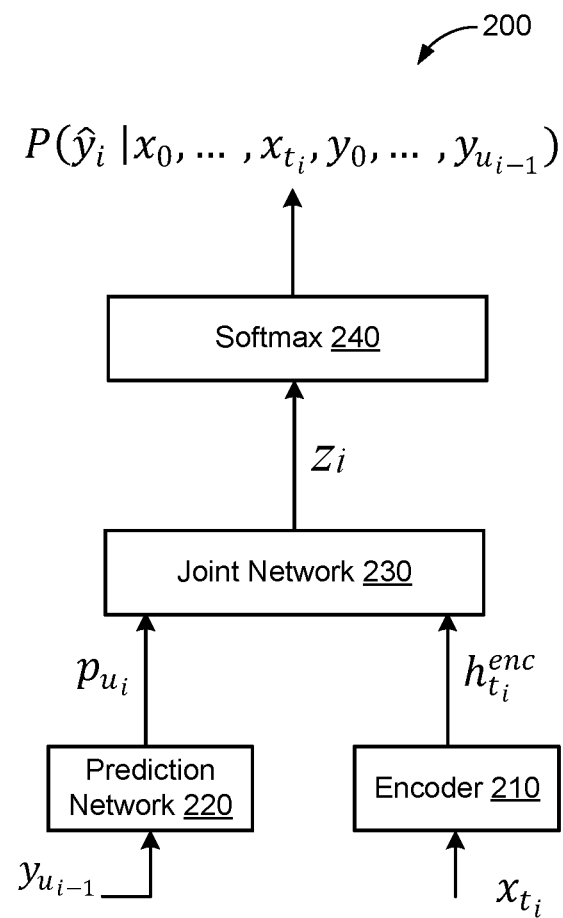
FIG. 2 is a schematic view of an example automatic speech recognition model.

Referring now to FIG. 2, in some implementations, the ASR model 200 includes a Recurrent Neural Network-Transducer (RNN-T) model architecture which adheres to latency constraints with interactive applications. The use of the RNN-T model architecture is exemplary only, as the ASR model 200 may include other architectures such as transformer-transducer and conformer-transducer model architectures, among others. The RNN-T model 200 provides a small computational footprint and utilizes less memory requirements than conventional ASR architectures, making the RNN-T model architecture suitable for performing speech recognition entirely on the user device 110 (e.g., no communication with a remote server is required). The RNN-T model 200 includes an encoder network (e.g., audio encoder) 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, audio encoder 210 reads a sequence of d-dimensional feature vectors (e.g., acoustic frames 108 (FIG. 1)) $x=(x_1, x_2, \ldots, x_T)$, where $x_t \in \mathbb{R}^d$, and produces at each output step a higher-order feature representation (e.g., audio encoding). This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the speech recognition result (e.g., transcription) 120 (FIG. 1).

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics, but also on the sequence of labels output so far. The RNN-T model 200 does assume an output symbol is independent of future acoustic frames 108, which allows the RNN-T model to be employed in the streaming fashion, the non-streaming fashion, or some combination thereof.

In some examples, the audio encoder 210 of the RNN-T model includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance, 16 layers. Moreover, the audio encoder 210 may operate in the streaming fashion (e.g., the audio encoder 210 outputs initial higher-order feature representations as soon as they are generated), in the non-streaming fashion (e.g., the audio encoder 210 outputs subsequent higher-order feature representations by processing additional right-context to improve initial higher-order feature representations), or in a combination of both the streaming and non-streaming fashion.

Figure 3:
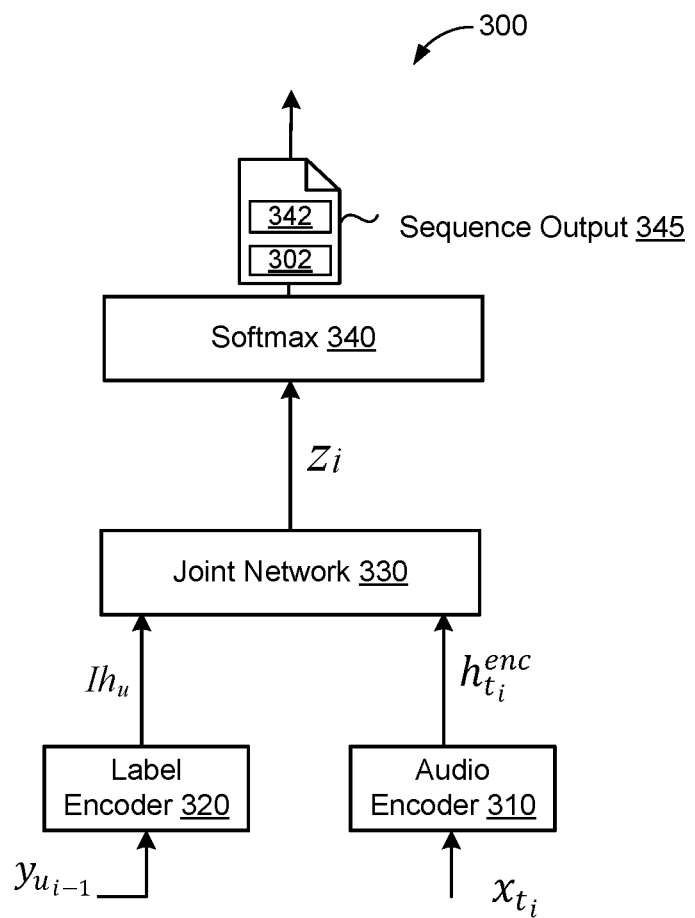
FIG. 3 is a schematic view of an example sequence transduction model.

Referring now to FIG. 3, in some implementations, the sequence transduction model 300 includes a Transformer-Transducer (T-T) architecture. The use of the T-T model architecture is exemplary only, as the sequence transduction model 300 may include other architectures such as RNN-T and conformer-transducer model architectures, among others. The sequence transduction model 300 includes an encoder network (e.g., audio encoder) 310, a label encoder 320, a joint network 330, and a Softmax layer 340. The audio encoder 310 may include a stack of multi-head self-attention layers, for example, 15 transformer layers, each layer having 32 frames of left context and 0 frames of right context. Moreover, the audio encoder 310 includes a stacking layer after the second transformer layer to change the frame rate from 30 milliseconds to 90 milliseconds, and an unstacking layer after the thirteenth transformer layer to change the frame rate from 90 milliseconds back to 30 milliseconds. The audio encoder 310 reads a sequence of d-dimensional feature vectors (e.g., acoustic frames 108 (FIG. 1)) $x=(x_1, x_2, \ldots, x_T)$, where $x_t \in \mathbb{R}^d$, and produces at each output step a higher-order feature representation (e.g., audio encoding). This higher-order feature representation is denoted as $h_1^{enc}, \ldots, h_T^{enc}$. That is, the sequence transduction model 300 extracts a 128-dimensional log mel frequency cepstral coefficient, stacks every 4 frames, and sub-samples every 3 frames, to produce a 512-dimensional acoustic feature vector with a stride of 30 milliseconds as the input to the audio encoder 310.

The label encoder 320 is a long short-term network (LSTM) network that, for example, has a single 128-dimensional LSTM layer. The label encoder 320 receives the sequence of non-blank symbols output by the final Softmax layer 340 and outputs a label encoding $lh_u$. The joint network 230 includes a projection layer and a stack of fully-connected layers. The projection layer projects the audio encodings from the audio encoder 310 and the label encodings from the label encoder 320 to produce a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (75) symbols, e.g., one label for each of the 26-letters in the English alphabet, punctuation symbols, special symbols (e.g., "$"), the predicted speaker change token 302 (FIG. 1), and one label designating a space. Accordingly, the joint network 330 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 330 can include a posterior probability value for each of the different output labels. Thus, if there are 100 different output labels representing different graphemes or other symbols, the output $y_i$ of the joint network 330 can include 100 different probability values, one for each output label.

The probability distribution can then be used to select and assign scores to candidate orthographic elements (e.g., graphemes, wordpieces, and/or words) in a beam search process (e.g., by the Softmax layer 340) for determining a sequence output 345. Described in greater detail with reference to FIG. 4, the sequence output 345 generated by the sequence transduction model 300 includes a transcription 342 (or probability distribution over possible speech recognition hypotheses) and the sequence of predicted speaker change tokens 302 during training. In particular, each possible speech recognition hypothesis is associated with a respective sequence of predicted speaker change tokens 302. In some examples, each transcription 342 includes the sequence of predicted speaker change tokens 302 embedded directly within the transcription 342, for example, "how are you doing <st> I am good <st>." On the other hand, as shown in FIG. 1, the sequence transduction model 300 only outputs the sequence of predicted speaker change tokens 302 and not the transcription 342.

Figure 4:
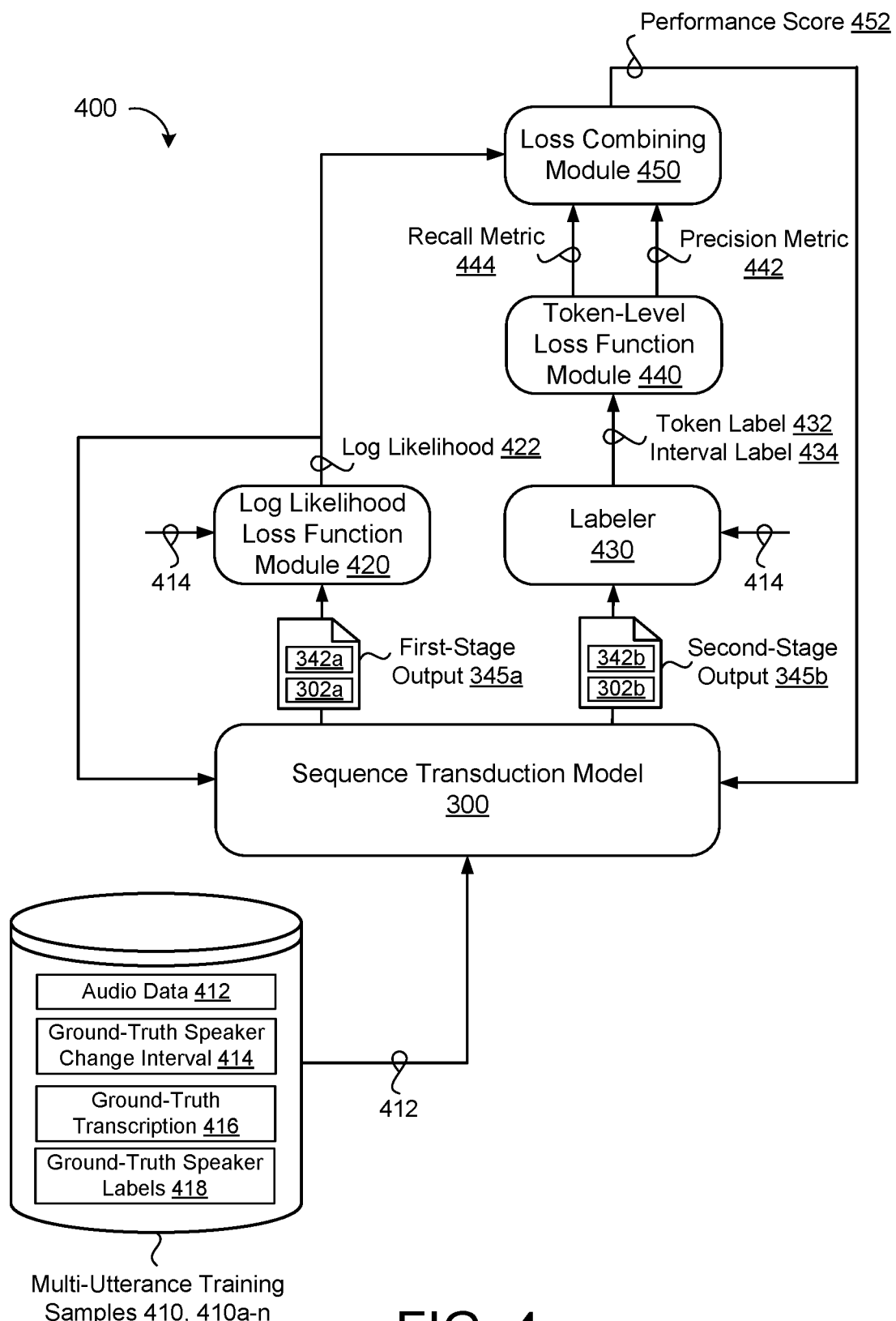
FIG. 4 is a schematic view of an example two-stage training process for training the sequence transduction model.

FIG. 4 illustrates an example two-stage training process 400 for training the sequence transduction model 300. The example two-stage training process 400 (also referred to as simply "training process 400") may execute at the user device 110 and/or the cloud computing environment 140. The training process 400 obtains a plurality of multi-utterance training samples 410 for training the sequence transduction model 300. As will become apparent, the two-stage training process 400 trains the sequence transduction model 300 during a first-stage by determining a negative log likelihood loss term 422 for each multi-utterance training sample 410 of the plurality of multi-utterance training samples 410 and updates parameters of the sequence transduction model 300 based on the negative log likelihood loss terms 422. Thereafter, during a second-stage, the two-stage training process 400 fine-tunes the sequence transduction model 300 that was trained during the first-stage by determining a precision loss 442 and a recall loss 444 for each multi-utterance training sample 410 of the plurality of multi-utterance training samples 410 and updates parameters of the sequence transduction model 300 based on the precision losses 442 and the recall losses 444.

Each multi-utterance training sample 410 includes audio data 412 characterizing utterances spoken by two or more different speakers. The audio data 412 of each multi-utterance training sample 410 may be paired with corresponding ground-truth speaker change intervals 414 indicating time intervals in the audio data 412 where speaker changes among the two or more different speakers occur. For example, in a conversation where speaker A spoke from 0.1-10.5 seconds and speaker B spoke from 10.8-15.3 seconds, the ground-truth speaker change interval 414 indicates the time interval of 10.5-10.8 seconds where the speaker change occurred. Thus, in this example, the training process 400 labels any predicted speaker change during the time interval of 10.5-10.8 as correct. Additionally, the training process 400 may apply a collar (e.g., a 250 millisecond collar) such that, in the above example, the time interval is 10.75-11.05 seconds instead of 10.5-10.8 seconds. Moreover, the audio data 412 of each multi-utterance training sample 410 may be paired with a ground-truth transcription 416 indicating a textual representation of what was spoken in the audio data 412. That is, as discussed above, the sequence transduction model 300 may optionally output transcriptions 342 during the training process 400.

In some implementations, each multi-utterance training sample 410 includes ground-truth speaker labels 418 paired with the audio data 412 such that each ground-truth speaker label 418 indicates a corresponding time-stamped segment in the audio data 412 associated with a respective one (or multiple) of the utterances spoken by one of the two or more different speakers. In these implementations, the training process 400 obtains the ground-truth speaker change intervals 414 by identifying each time interval where two or more of the time-stamped segments overlap as a corresponding ground-truth speaker change interval 414 and identifying each time gap indicating a pause between two adjacent time-sampled segments in the audio data associated with respective ones of the utterances spoken by the two different speakers as a corresponding ground-truth speaker change interval.

Figure 5:
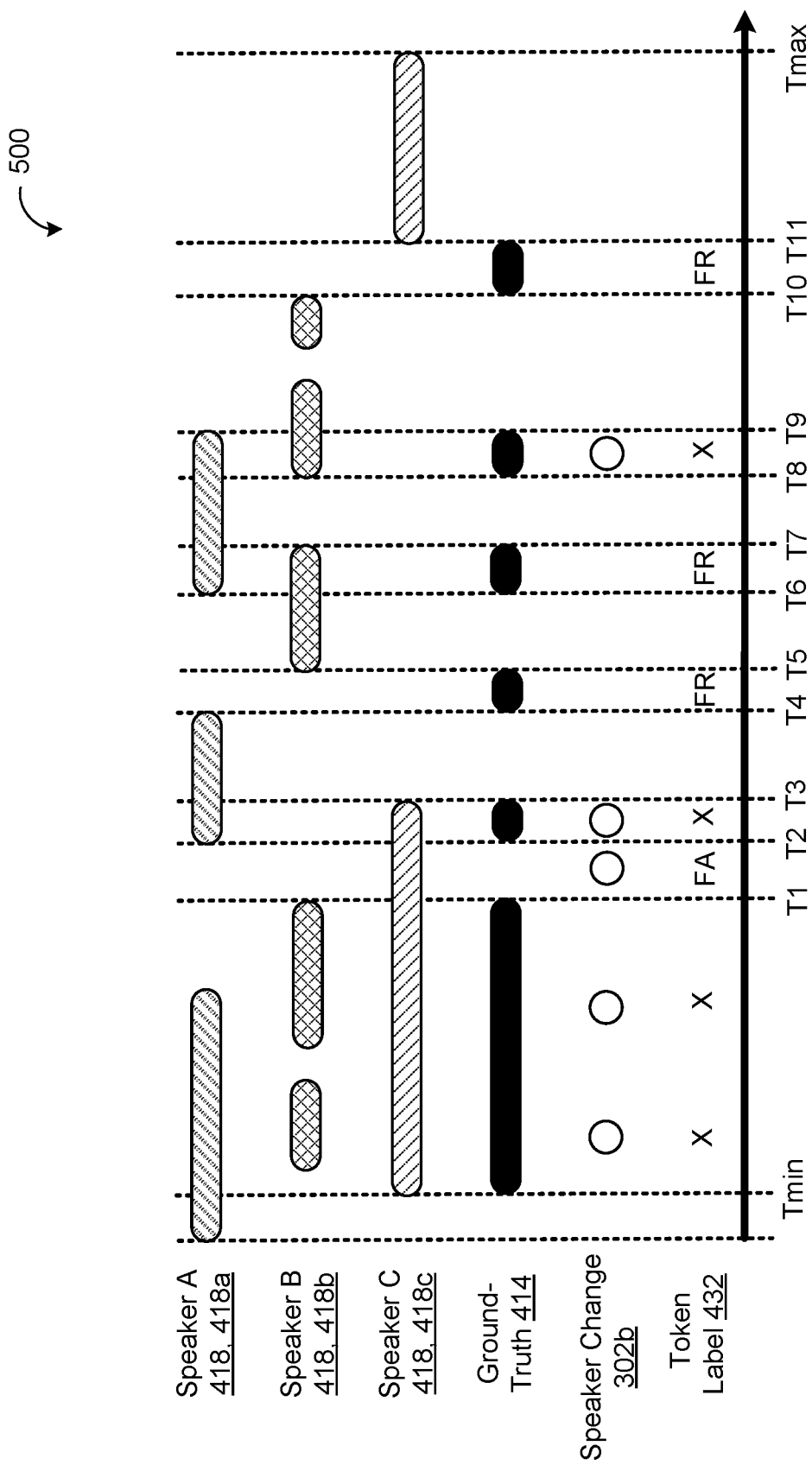
FIG. 5 is a graphical view of multiple components for computing a precision metric and a recall metric.

For example, FIG. 5 depicts a graphical view 500 of various components of the training process 400 (FIG. 4) with an x-axis denoting timestamps (e.g., Tmin–Tmax) increasing from left to right. The graphical view 500 includes a first ground-truth speaker label 418, 418a indicating when speaker A was speaking, a second ground-truth speaker label 418, 418b indicating when speaker B was speaking, and a third ground-truth speaker label 418, 418c indicating when speaker C was speaking. Moreover, the training process 400 (FIG. 4) may obtain the ground-truth speaker change intervals 414 by identifying where two or more ground-truth speaker labels 418 overlap as a corresponding ground-truth speaker change interval 414. For instance, in the example shown, the first ground-truth speaker label 418a and the third ground-truth speaker label 418c overlap between timestamps T2 and T3 such that the training process 400 identifies the time interval between timestamps T2 and T3 as a corresponding ground-truth speaker change interval 414. In some implementations, the training process 400 obtains the ground-truth speaker change intervals 414 by identifying where there is a time gap indicating a pause between two adjacent ground-truth speaker labels 418. In the example shown, there is a time gap between timestamps T4 and T5 indicating a pause between the first ground-truth speaker label 418a and the second ground-truth speaker label 418b such that the training process 400 identifies the time interval between timestamps T4 and T5 as a corresponding ground-truth speaker change interval 414.

In some implementations, the training process 400 (FIG. 4) determines a minimum start time (Tmin) and a maximum start time (Tmax) of the audio data 412 based on the time-stamped segmented indicated by the ground-truth speaker labels 418. In these implementations, the training process 400 omits any predicted speaker change tokens 302 having timestamps earlier than the minimum start time or later than the maximum start time from determination of a precision metric 442 (FIG. 4) of the sequence transduction model 300. For instance, in the example shown in FIG. 5, the training process 400 would omit any predicted speaker change tokens 302 to the left of Tmin or to the right of Tmax.

Referring back to FIG. 4, during a first-stage of the training process 400, the sequence transduction model 300 processes the audio data 412 of each multi-utterance training sample 410 to generate a corresponding first-stage sequence output 345, 345*a* that includes a respective first-stage transcription 342, 342*a* and a respective first-stage sequence of predicted speaker change tokens 302, 302*a*. The sequence transduction model 300 may determine whether to output a predicted speaker change token 302 based on the corresponding semantic information of the transcriptions 342. Thereafter, a log likelihood loss function module 420 determines a negative log likelihood loss term 422 based on comparing the corresponding first-stage output sequence 345*a* with the associated ground-truth speaker change intervals 414 and the associated ground-truth transcription 416. That is, the log likelihood loss function module 420 compares the respective first-stage transcription 342*a* with the corresponding ground-truth transcription 416 and compares the respective first-stage sequence of predicted speaker change tokens 302*a* with the corresponding ground-truth speaker change intervals 414 to determine the negative log likelihood loss term 422. More specifically, the log likelihood loss function module 420 determines whether the first-stage predicted speaker change tokens 302*a* overlap any of the ground-truth speaker change intervals 414. Here, overlap between the first-stage predicted speaker change tokens 302*a* and the ground-truth speaker change intervals 414 indicate a correct prediction by the sequence transduction model 300. The first-stage of the training process 400 trains the sequence transduction model 300 by updating parameters of the sequence transduction model 300 based on the negative log likelihood loss term 422 determined for each multi-utterance training sample 410.

Thereafter, during the second-stage, the training process 400 warm-starts the sequence transduction model 300 trained during the first-stage of the training process 400. After warm-starting the sequence transduction model 300, the second-stage of the training process 400 fine-tunes the model using the same plurality of multi-utterance training samples 410 used to train the sequence transduction model 300 during the first-stage. Notably, during the second-stage of the training process 400, the sequence transduction model 300 uses the updated parameters resulting from the first-stage of the training process 400. That is, the sequence transduction model 300 processes the audio data 412 of each multi-utterance training sample 410 to generate a corresponding second-stage sequence output 345, 345*b* that includes a respective second-stage transcription 342, 342*b* and a respective second-stage sequence of predicted speaker change tokens 302, 302*b*.

A labeler 430 receives the second-stage sequence output 345*b* generated by the sequence transduction model 300 for each of the multi-utterance training samples 410 and performs a beam search to select both the N-best transcriptions from the second-stage transcription 342*b* and the second-stage sequence of predicted speaker change tokens 302*b* corresponding to the selected N-best transcriptions. For example, the second-stage transcription 342*b* may include 10 candidate transcriptions based on the corresponding multi-utterance training sample 410 whereby the labeler 430 selects the top 3 candidate transcriptions associated having a greatest confidence value score and the 3 corresponding second-stage sequence of predicted speaker change tokens 302*b*. For each second-stage predicted speaker change token 302 (e.g., selected by the labeler 430), the labeler 430 generates a token label 432 that labels the corresponding second-stage predicted speaker change token 302*b* as either correct, false acceptance, or false rejection.

A correct token label 432 indicates that the second-stage predicted speaker change token 302*b* output by the sequence transduction model 300 correctly predicted a speaker change in the audio data 412. That is, when a respective second-stage predicted speaker change token 302*b* overlaps with one of the ground-truth speaker change intervals 414, the labeler 430 generates the token label 432 labeling the respective second-stage predicted speaker change token 302*b* as correct. For instance, as shown in FIG. 5, the sequence transduction model 300 output a respective second-stage predicted speaker change token 302*b* indicating a speaker change occurred between timestamps T8 and T9 that overlaps the ground-truth speaker change interval 414 occurring between timestamps T8 and T9. Accordingly, the token label 432 between timestamps T8 and T9 indicates the respective second-stage predicted speaker change token 302*b* is correct (denoted by "X").

In some examples, the false acceptance token label 432 indicates that the sequence transduction model 300 output a respective second-stage predicted speaker change token 302*b* when no speaker change actually occurred in the audio data 412 (e.g., as indicated by the ground-truth speaker change intervals 414). Here, the labeler 430 labels the corresponding second-stage predicted speaker change token 302*b* as a false acceptance prediction when the corresponding second-stage predicted speaker change token 302*b* does not overlap with any of the ground-truth speaker change intervals 414. As shown in FIG. 5, the sequence transduction model 300 outputs a respective second-stage predicted speaker change token 302*b* indicating a speaker change occurred between timestamps T1 and T2 that does not overlap with any ground-truth speaker change intervals 414. Therefore, the token label 432 between timestamps T1 and T2 indicates the respective second-stage predicted speaker change token 302*b* is a false acceptance prediction (denoted by "FA").

In yet other examples, the false rejection token label 432 indicates that the sequence transduction model 300 failed to output a respective second-stage predicted speaker change token 302*b* when a speaker change actually occurred in the audio data 412 (e.g., as indicated by the ground-truth speaker change intervals 414). Here, the labeler 430 generates a false rejection token label 432 when a ground-truth speaker change interval 414 occurs without any second-stage predicted speaker change token 302*b* overlapping the ground-truth speaker change interval 414. As shown in FIG. 5, a respective ground-truth speaker change interval 414 exists between timestamps T4 and T5 and the sequence transduction model 300 did not output any second-stage predicted speaker change token 302*b* between timestamps T4 and T5. As such, the token label 432 between time T4 and T5 indicates the false reject prediction (denoted by "FR").

A token-level loss function module 440 receives the token labels 432 generated by the labeler 430 for each multi-utterance training sample 410 and determines a precision metric 442 and a recall metric 444. That is, the token-level loss function module 440 determines the precision metric 442 based on a number of the second-stage predicted speaker change tokens 302*b* labeled as correct and a total number of second-stage predicted speaker change tokens 302*b* in the second-stage sequence of predicted speaker change tokens 302*b*. Stated differently, the token-level loss function module 440 determines the precision metric 442 based on a ratio between the number of the second-stage predicted speaker change tokens 302b labeled as correct and the total number of second-stage predicted speaker change tokens 302b in the second-stage sequence of predicted speaker change tokens 302b. Although not shown in FIG. 4, the training process 400 may train the sequence transduction model 300 by updating parameters of the sequence transduction model 300 based directly on the precision metric 442.

In some implementations, the labeler 430 labels each ground-truth speaker change interval 414. That is, the labeler 430 generates an interval token 434 indicating a correct match when any of the second-stage predicted speaker change tokens 302b overlap with the corresponding ground-truth speaker change interval 434. On the other hand, the labeler 430 generates the interval token 434 indicating an incorrect match when none of the second-stage predicted speaker change tokens 302b overlap with the corresponding ground-truth speaker change interval 434. The token-level loss function module 440 receives the interval tokens 434 generated by the labeler 430 for each multi-utterance training sample 410. In some examples, the token-level loss function module 440 determines the recall metric 444 of the sequence transduction model 300 based on a number of the ground-truth speaker change intervals 414 labeled as correctly matched and a total number of all of the ground-truth speaker change intervals 414. In other examples, the token-level loss function module 440 determines the recall metric 444 of the sequence transduction model 300 based on a duration of the ground-truth speaker change intervals labeled as correctly matched and a total duration of all of the ground-truth speaker change intervals. Determining the recall metric based on duration favors multi-utterance training samples 410 with longer speaker change intervals. Although not shown in FIG. 4, the training process 400 may train the sequence transduction model 300 by updating parameters of the sequence transduction model 300 based directly on the recall metric 444.

In some implementations, M may represent a number of multi-utterance training samples 410, N represents a number of hypotheses per training sample such that $H_{ij}$ is the j-th hypothesis for the i-th multi-utterance training sample 410. Moreover, i is between [1, M], j is between [1, N], $P_{ij}$ represents the probability score associated with $H_{ij}$ generated by the sequence transduction model 300, and $R_{ij}$ is the reference transcription. Thus, the token-level loss function module 440 determines a minimum edit distance alignment (i.e., loss) between all $H_{ij}$ and $R_{ij}$ according to:

$$\text{sub-cost}(r, h) = \begin{cases} 0 & \text{if } r = h \\ 1 & \text{if } r \neq h \neq <st> \\ +\infty & \text{Otherwise} \end{cases} \quad (1)$$

$$\text{ins/del-cost}(\text{token}) = \begin{cases} k & \text{if token} = <st> \\ 1 & \text{Otherwise} \end{cases} \quad (2)$$

In Equations 1 and 2, r and h represent tokens in $R_{ij}$ and $H_{ij}$, respectively. Moreover, k≥1 controls the tolerance of the offset in predicting <st> such that if k=1 the training process 400 expects an exact match between reference and predicted <st>. If k>1 the training process 400 allows a maximum offset of k tokens between a pair of reference and predicted <st> tokens for them to be considered correctly aligned.

In some examples, a loss combining module 450 receives the precision metric 442 and the recall metric 444 and determines a performance score 452 of the sequence transduction model 300 based on the precision metric 442 and the recall metric 444. For instance, determining the performance score 452 may include calculating the performance score based on the equation "2*(precision metric*recall metric)/(precision metric+recall metric)." In some implementations, the loss combining module 450 determines the precision metric 442 based on the precision metric 442, the recall metric 444, and the negative log likelihood loss term 422. The training process 400 trains the sequence transduction model 300 by updating parameters of the sequence transduction model 300 based on the performance score 452. For instance, the loss combining module 450 determines the token-level loss according to:

$$L_{ij} = P_{ij} \frac{\alpha W_{ij} + \beta FA_{ij} + \gamma FR_{ij}}{Q_{ij}} \quad (3)$$

In Equation 3, $FA_{ij}$ represents the number of false acceptance errors, $FR_{ij}$ represents the number of false rejection errors, $W_{ij}$ represents the number of spoken word errors, $Q_{ij}$ represents the total number of tokens in $R_{ij}$, and α, β, and γ control the influence (i.e., weight) of each subcomponent. In some examples, β and γ are significantly larger than γ to reduce the speaker change insertion and deletion rates. Thus, the final per batch training loss is represented by:

$$L = \sum_{i=1}^{M} \sum_{j=1}^{N} L_{ij} + \lambda(-\log P(y|x)) \quad (4)$$

In Equation 4, −log P(y|x) is the negative log likelihood of the ground truth transcription Y conditioned on the input acoustic frame X thereby acting as a regularization term. Moreover, λ controls the weight of the negative likelihood loss.

Advantageously, in some examples, the training process 400 determines the precision metric 442 of the sequence transduction model 300 by determining the precision metric 442 that is not based on any word-level speech recognition results (e.g., transcription 342) output by the sequence transduction model 300. In other examples, determining the precision metric 442 does not require the training process 400 to perform full speaker diarization on the audio data 412. Instead, the training process 400 may simply output the predicted speaker change tokens 302 and the transcription 342 without assigning a speaker label to each frame or token of the transcription 342.

Figure 6:
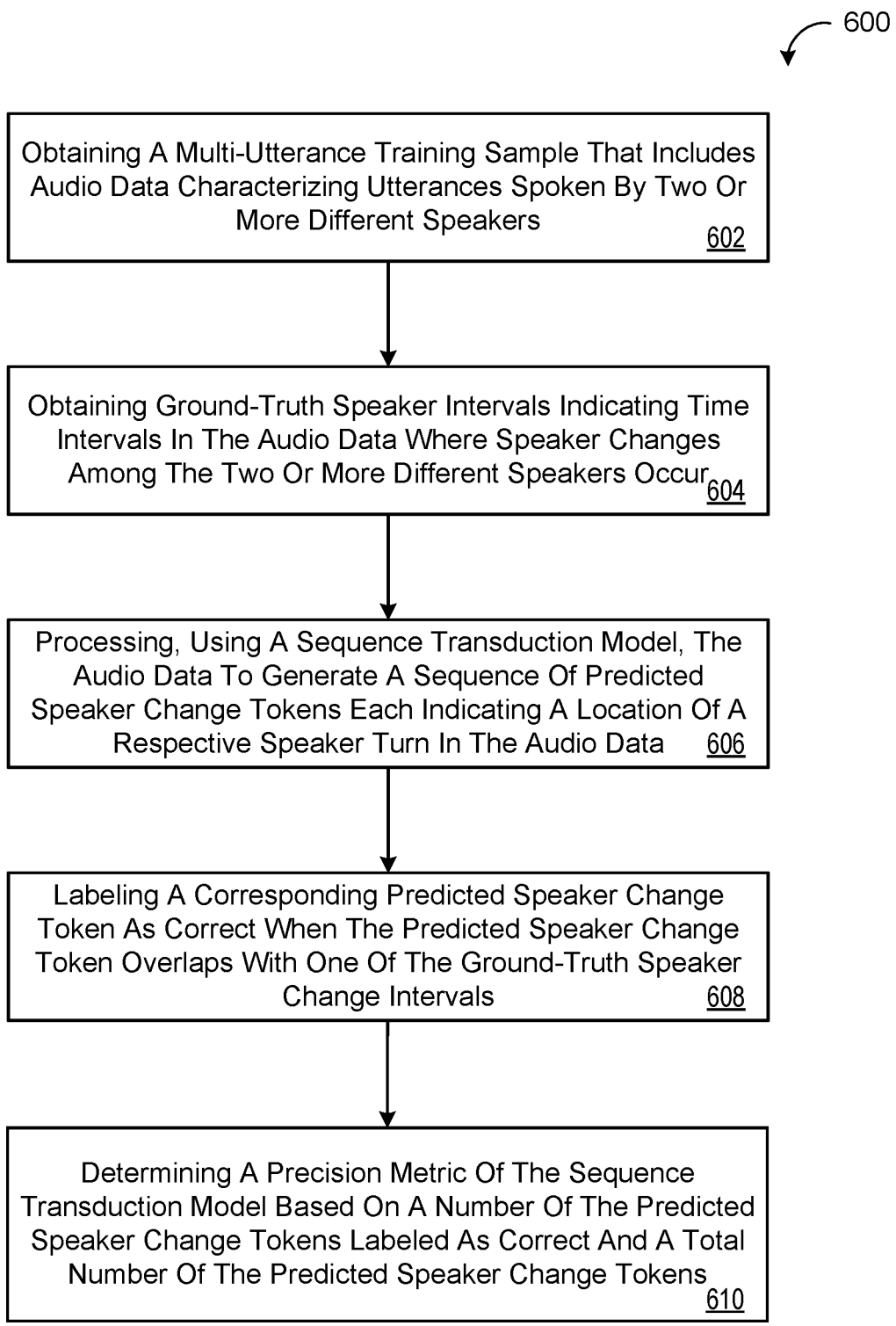
FIG. 6 is a flowchart of an example arrangement of operations for a computer-implemented method of evaluation-based speaker change detection evaluation metrics.

FIG. 6 includes a flowchart of an example arrangement of operations for a computer-implemented method for evaluating speaker change detection in a multi-speaker continuous conversational input audio stream. The method 600 may execute on data processing hardware 710 (FIG. 7) using instructions stored on memory hardware 720 (FIG. 7) that may reside on the user device 110 and/or the cloud computing environment 140 of FIG. 1 corresponding to a computing device 700 (FIG. 7).

At operation 602, the method 600 includes obtaining a multi-utterance training sample 410 that includes audio data 412 characterizing utterances spoken by two or more different speakers. At operation 604, the method 600 includes obtaining ground-truth speaker change intervals 414 that indicate time intervals in the audio data 412 where speaker changes among the two or more different speakers occur. At operation 606, the method 600 includes processing, using a sequence transduction model 300, the audio data 412 to generate a sequence of predicted speaker change tokens 302 each indicating a location of a respective speaker turn in the audio data. At operation 608, for each corresponding predicted speaker change token 302, the method 600 includes labeling the corresponding predicted speaker change token 302 as correct when the predicted speaker change token 302 overlaps with one of the ground-truth speaker change intervals 414. At operation 610, the method 600 includes determining a precision metric 442 of the sequence transduction model 300 based on a number of the predicted speaker change tokens 302 labeled as correct and a total number of the predicted speaker change tokens 302 in the sequence of predicted speaker change tokens 302. In some examples, the method 600 includes determining a recall metric 444 (additionally or alternatively to the precision metric 442) of the sequence transduction model 300 based on a duration of the ground-truth speaker change intervals 414 labeled as correctly matched and a total duration of all of the ground-truth speaker change intervals 414.

Figure 7:
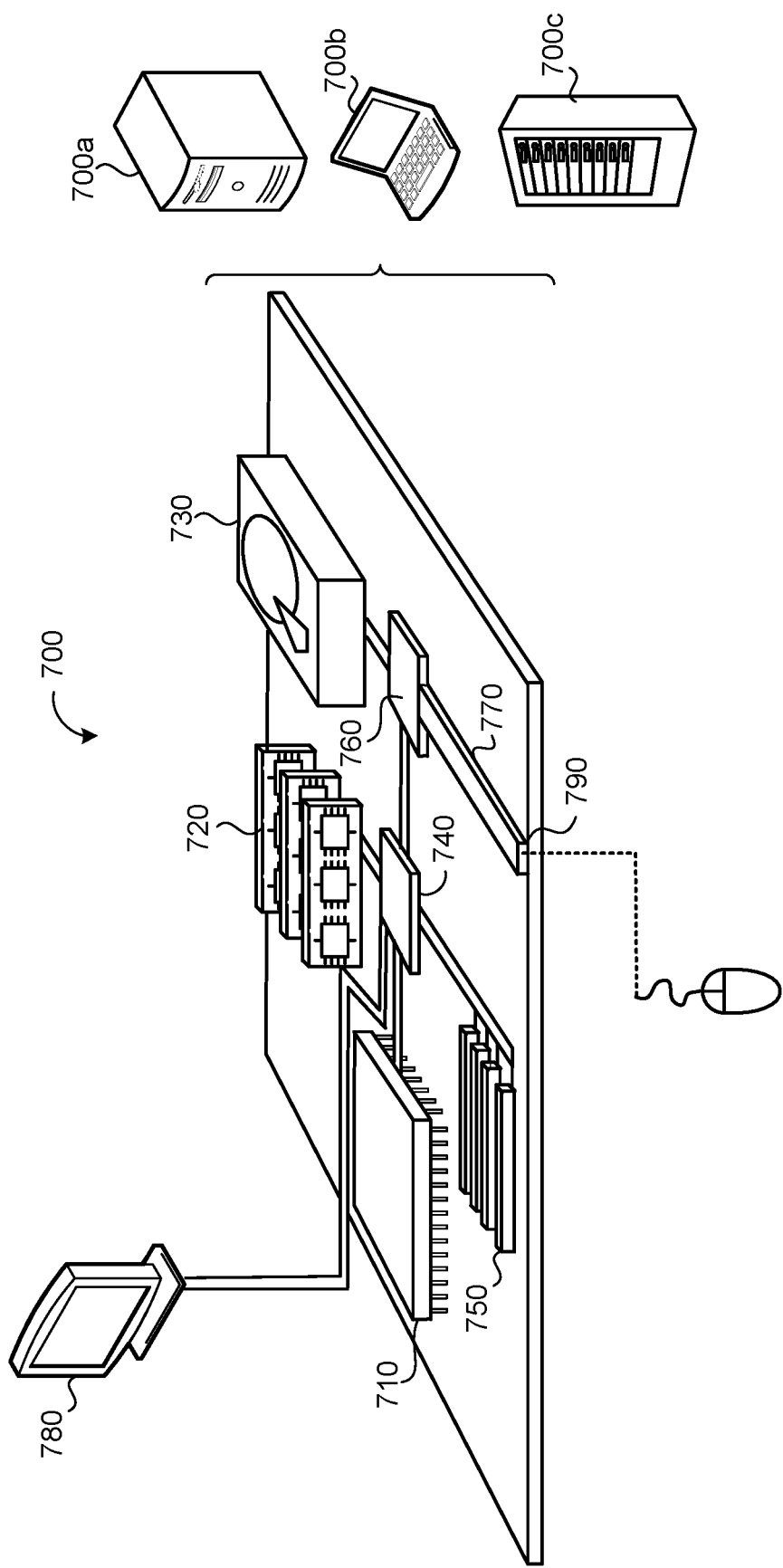
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations for evaluating speaker change detection in a multi-speaker continuous conversational input audio stream, the operations comprising:
    obtaining a multi-utterance training sample that comprises audio data characterizing utterances spoken by two or more different speakers;
    obtaining ground-truth speaker change intervals indicating time intervals in the audio data where speaker changes among the two or more different speakers occur;
    processing, using a sequence transduction model, the audio data to generate a sequence of predicted speaker change tokens each indicating a location of a respective speaker turn in the audio data;
    for each corresponding predicted speaker change token, labeling the corresponding predicted speaker change token as correct when the predicted speaker change token overlaps with one of the ground-truth speaker change intervals; and
    determining a precision metric of the sequence transduction model based on a number of the predicted speaker change tokens labeled as correct and a total number of the predicted speaker change tokens in the sequence of predicted speaker change tokens.

2. The computer-implemented method of claim 1, wherein determining the precision metric of the sequence transduction model is based on a ratio between the number of the predicted speaker change tokens labeled as correct and the total number of the predicted speaker change tokens in the sequence of predicted speaker change tokens.

3. The computer-implemented method of claim 1, wherein the operations further comprise, for each corresponding predicted speaker change token, labeling the corresponding predicted speaker change token as a false acceptance prediction when the corresponding predicted speaker change token does not overlap with any of the ground-truth speaker change intervals.

4. The computer-implemented method of claim 1, wherein the operations further comprise:
    for each ground-truth speaker change interval, labeling the corresponding ground-truth speaker change interval as correctly matched when any of the predicted speaker change tokens overlap with the corresponding ground-truth speaker change interval; and
    determining a recall metric of the sequence transduction model based on a duration of the ground-truth speaker change intervals labeled as correctly matched and a total duration of all of the ground-truth speaker change intervals.

5. The computer-implemented method of claim 4, wherein the operations further comprise determining a performance score of the sequence transduction model based on the precision metric and the recall metric.

6. The computer-implemented method of claim 5, wherein determining the performance score comprises calculating the performance score based on the equation: 2*(precision metric*recall metric)/(precision metric+recall metric).

7. The computer-implemented method of claim 1, wherein the operations further comprise:
    for each ground-truth speaker change interval, labeling the corresponding ground-truth speaker change interval as correctly matched when any of the predicted speaker change tokens overlap with the corresponding ground-truth speaker change interval; and
    determining a recall metric of the sequence transduction model based on a number of the ground-truth speaker change intervals labeled as correctly matched and a total number of all of the ground-truth speaker change intervals.

8. The computer-implemented method of claim 7, wherein the operations further comprise determining a performance score of the sequence transduction model based on the precision metric and the recall metric.

9. The computer-implemented method of claim 1, wherein determining the performance score comprises calculating the performance score based on the equation: 2*(precision metric*recall metric)/(precision metric+recall metric).

10. The computer-implemented method of claim 1, wherein:
the multi-utterance training sample further comprises ground-truth speaker labels paired with the audio data, the ground-truth speaker labels each indicating a corresponding time-stamped segment in the audio data associated with a respective one of the utterances spoken by one of the two or more different speakers; and
obtaining the ground-truth speaker change intervals comprises:
identifying, as a corresponding ground-truth speaker change interval, each time interval where two or more of the time-stamped segments overlap; and
identifying each time gap indicating a pause between two adjacent time-stamped segments in the audio data associated with respective ones of the utterances spoken by two different speakers.

11. The computer-implemented method of claim 10, wherein the operations further comprise:
determining a minimum start time and a maximum start time of the audio data based on the time-stamped segments indicated by the ground-truth speaker labels; and
omitting, from the determination of the precision metric of the sequence transduction model, any predicted speaker change tokens having time stamps earlier than the minimum start time or later than the maximum start time.

12. The computer-implemented method of claim 1, wherein determining the precision metric of the sequence transduction model is not based on any word-level speech recognition results output by the sequence transduction model.

13. The computer-implemented method of claim 1, wherein the determining the precision metric does not require performance of full speaker diarization on the audio data.

14. A system comprising:
data processing hardware; and
memory hardware in communication with the data processing hardware, the memory hardware storing instructions that when executed on the data processing hardware cause the data processing hardware to perform operations comprising:
obtaining a multi-utterance training sample that comprises audio data characterizing utterances spoken by two or more different speakers;
obtaining ground-truth speaker change intervals indicating time intervals in the audio data where speaker changes among the two or more different speakers occur;
processing, using a sequence transduction model, the audio data to generate a sequence of predicted speaker change tokens each indicating a location of a respective speaker turn in the audio data;
for each corresponding predicted speaker change token, labeling the corresponding predicted speaker change token as correct when the predicted speaker change token overlaps with one of the ground-truth speaker change intervals; and
determining a precision metric of the sequence transduction model based on a number of the predicted speaker change tokens labeled as correct and a total number of the predicted speaker change tokens in the sequence of predicted speaker change tokens.

15. The system of claim 14, wherein determining the precision metric of the sequence transduction model is based on a ratio between the number of the predicted speaker change tokens labeled as correct and the total number of the predicted speaker change tokens in the sequence of predicted speaker change tokens.

16. The system of claim 14, wherein the operations further comprise, for each corresponding predicted speaker change token, labeling the corresponding predicted speaker change token as a false acceptance prediction when the corresponding predicted speaker change token does not overlap with any of the ground-truth speaker change intervals.

17. The system of claim 14, wherein the operations further comprise:
for each ground-truth speaker change interval, labeling the corresponding ground-truth speaker change interval as correctly matched when any of the predicted speaker change tokens overlap with the corresponding ground-truth speaker change interval; and
determining a recall metric of the sequence transduction model based on a duration of the ground-truth speaker change intervals labeled as correctly matched and a total duration of all of the ground-truth speaker change intervals.

18. The system of claim 17, wherein the operations further comprise determining a performance score of the sequence transduction model based on the precision metric and the recall metric.

19. The system of claim 18, wherein determining the performance score comprises calculating the performance score based on the equation: 2*(precision metric*recall metric)/(precision metric+recall metric).

20. The system of claim 14, wherein the operations further comprise:
for each ground-truth speaker change interval, labeling the corresponding ground-truth speaker change interval as correctly matched when any of the predicted speaker change tokens overlap with the corresponding ground-truth speaker change interval; and
determining a recall metric of the sequence transduction model based on a number of the ground-truth speaker change intervals labeled as correctly matched and a total number of all of the ground-truth speaker change intervals.

21. The system of claim 20, wherein the operations further comprise determining a performance score of the sequence transduction model based on the precision metric and the recall metric.

22. The system of claim 14, wherein determining the performance score comprises calculating the performance score based on the equation: 2*(precision metric*recall metric)/(precision metric+recall metric).

23. The system of claim 14, wherein:
the multi-utterance training sample further comprises ground-truth speaker labels paired with the audio data, the ground-truth speaker labels each indicating a corresponding time-stamped segment in the audio data associated with a respective one of the utterances spoken by one of the two or more different speakers; and
obtaining the ground-truth speaker change intervals comprises:
identifying, as a corresponding ground-truth speaker change interval, each time interval where two or more of the time-stamped segments overlap; and identifying each time gap indicating a pause between two adjacent time-stamped segments in the audio data associated with respective ones of the utterances spoken by two different speakers.

24. The system of claim 23, wherein the operations further comprise:
determining a minimum start time and a maximum start time of the audio data based on the time-stamped segments indicated by the ground-truth speaker labels; and
omitting, from the determination of the precision metric of the sequence transduction model, any predicted speaker change tokens having time stamps earlier than the minimum start time or later than the maximum start time.

25. The system of claim 14, wherein determining the precision metric of the sequence transduction model is not based on any word-level speech recognition results output by the sequence transduction model.

26. The system of claim 14, wherein the determining the precision metric does not require performance of full speaker diarization on the audio data.

* * * * *